3,084,208
UNDERGROUND PLASTIC PIPELINE SYSTEM FOR LAYING HIGH TENSION ELECTRIC CABLES
Giuseppe Palandri and Paolo Gazzana Priaroggia, Milan, Italy, assignors to Pirelli Societa per Azioni, Milan, Italy
Filed Apr. 19, 1957, Ser. No. 653,873
Claims priority, application Italy Apr. 28, 1956
4 Claims. (Cl. 174—24)

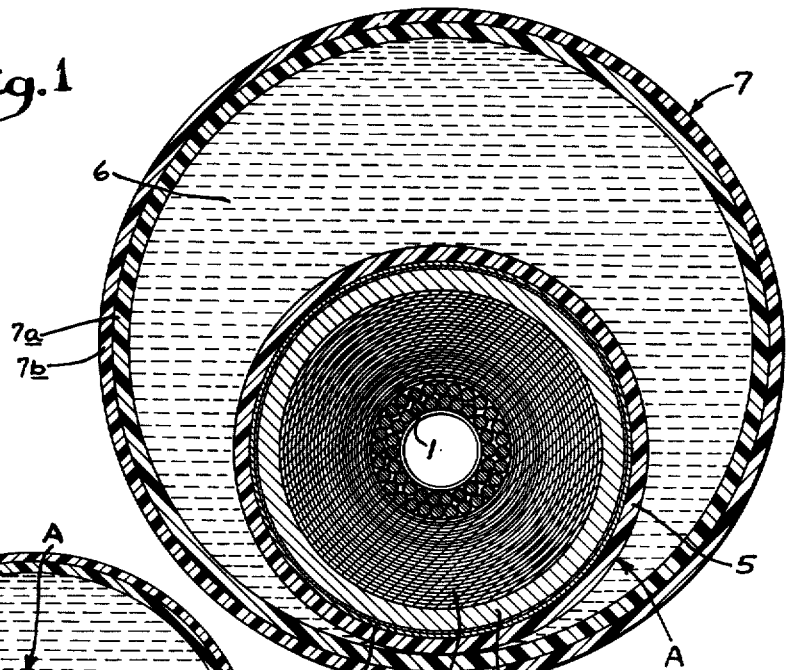
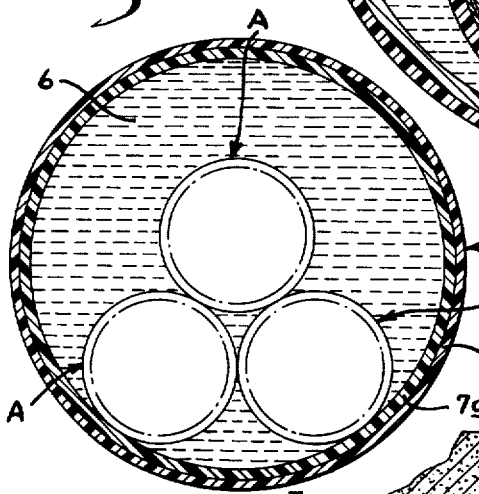
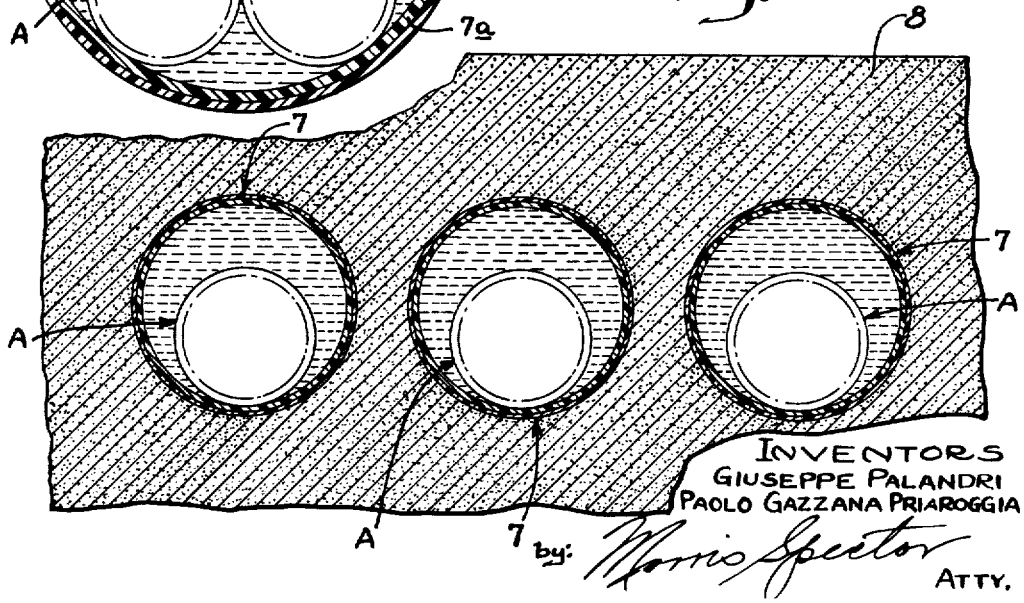
INVENTORS
GIUSEPPE PALANDRI
PAOLO GAZZANA PRIAROGGIA United States Patent Office 3,084,208
Patented Apr. 2, 1963

The present invention relates to high tension electric cables, to pipe lines for high tension electric cables, and to an improved system for laying high tension electric cables within underground pipe lines.

Since the first use of electric power for public utility services the problem has arisen of the underground conduits for the power distribution. The necessity of eliminating the aerial networks in the inhabited areas and the increasing employment of electricity have gradually led in all countries to a huge development of the cable networks.

For conveying and distributing high-voltage power, paper impregnated cables covered with a tight metal sheath, generally made of lead, aluminium or various alloys, are conventionally employed. It is known that said cables are often laid within concrete ducts in order to protect them against failures of mechanical origin, as for instance, during road work and the like, and to ensure their easy removal and substitution without the need of excavation works.

The concrete ducts are generally made of parallellepiped blocks provided with channels of circular section, into each of which a cable is pulled. The main disadvantage of this laying system is that, in consequence of the natural roughness of the concrete ducts, the cable lengths which may be drawn inside them are necessarily reduced, in particular when large size cables are concerned. Lengths exceeding 150 metres cannot be ordinarily pulled.

Moreover in said ducts the high thermal resistance created by the air layer between the cable sheath and the inner surface of the duct is not very conducive for rapid heat dissipation.

A further inconvenience is due to the possible corrosion of the cable metal sheath, particularly if it is lead, when water flows inside the concrete ducts, becoming alkaline at the contact with the concrete.

Another known laying system is that of pulling screened cable cores inside steel tubes placed underground. According to this system a trefoil of single-core cables suitably screened and protected, is pulled into a single steel tube so as to obtain a three-phase system enclosed within a single tube. This is necessary in order to prevent the very high magnetic losses which would occur in case each core were pulled into a separate steel tube. In the above described system the steel tube is not a simple pipe containing the cable cores, but from a strictly functional standpoint it constitutes an integrant part of them since the tube is filled with a fluid under pressure (oil or gas) which, depending whether the cores are covered or not with a permeable screen, may penetrate or not inside the dielectric itself. So for instance in the American system known as "oilostatic" three cores for high-tension cables, each covered with a fluid-permeable conductive screen, are pulled within a steel tube which is then filled with oil subjected to a pressure of 15 atmospheres for the purpose of placing under pressure the dielectric (impregnated paper) of the cable cores, which cable otherwise would not withstand the high voltages applied to it.

In comparison with the concrete ducts, the advantages shown by the above described system are the following:
(1) Owing to the low friction coefficient between the cores and the steel tube, in particular if they are provided with skid wires, remarkable cable lengths (for instant exceeding the 400 metres) may be pulled inside the tube, inasmuch as the cores are generally devoid of metallic sheath and have consequently a light weight;
(2) The possibility is maintained of pulling out and replacing in an easy way a faulty section of cable.

The above said system shows however the following disadvantages:
(a) High cost of the steel tubes which must have a thickness capable of withstanding high inner pressures;
(b) The tubes are exposed to corrosive actions of chemical and electrolytical nature (produced by stray currents) by the surrounding earth and have consequently to be protected by means of special coverings;
(c) The occurrence of magnetic losses in the steel constituting the tubes;
(d) The dielectric of the cable cores which, having not been sealed under pressure, requires the application of a high outer pressure in service, is always inferior to a dielectric impregnated under vacuum and sealed under pressure (even if this is small);
(e) The dielectric may be contaminated by foreign substances deposited on the inner surface of the tubes when, as at present generally happens, the cable cores are not covered with a perfectly impermeable sheath.

It is an object of the present invention to eliminate the main disadvantages of the second mentioned cable systems, wherein the cables are within steel tubes, maintaining however their main advantages.

An object of the present invention is the provision of a system of underground pipelines for laying single and multi-core high-tension electric cables, which cables are provided with a sheath perfectly impermeable to any outside agent, made for instance of a metallic material as lead, aluminum or various alloys, according to which system the cables are laid within underground tubes of synthetic plastic material, filled with a good heat-conductive liquid (as mineral or vegetable oil or water with an anti-freezing agent added where necessary) in order to reduce to the minimum the thermal resistance of the interspace between the cable and the tube.

The attainment of the above and further objects of the present invention will be apparent from the following specification taken in conjunction with the accompanying drawings forming a part thereof, and which show a non-limiting example of the cross sections of oil filled single core cables placed within plastic tubes.

In the drawings:
FIG. 1 is a transverse section of a single core cable within its duct, embodying the present invention;
FIG. 2 is a transverse section illustrating a three-phase line consisting of a trefoil of single core cables placed within separate tubes as in FIG. 1; and
FIG. 3 is a transverse section illustrating the same three-phase line consisting of a trefoil of single core cables placed within a single tube.

Reference may now be had more particularly to the accompanying drawings wherein like reference numerals designate like parts throughout.

A cable core of the present invention, indicated in all of the drawings by the reference numeral A includes a hollow stranded conductor 1 of a conventional construction, surrounded by insulation 2 consisting of impregnated paper wrapped about the stranded conductor, the same being enclosed in an impermeable sheath 3, which may also be of a standard construction, as for instance, lead, as known in the art. The sheath 3 is reinforced by a reinforcement 4 which consists of metal strips, for instance, made of brass, wound in closed turns on the sheath 3 with the inetrposition of a thin layer of bituminous cloth acting as a pad between the reinforcing winding 4 and the sheath 3. The only function of the winding 4 is that of reinforcing the sheath 3 in a transverse direction in order to withstand the inner presurses of the cable, since the cable may be maintained filled with an insulating fluid known in the art as for instance, a liquid such as, by way of example, oil under pressure.

The reinforcement 4 may be a single layer or may consist of two superposed layers of different pitch. In those cables where the reinforcement 4 is not needed, it is omitted. The entire cable is encased in an outer sheath 5 of low friction plastic material. A good heat conducting liquid is indicated at 6 which fills the space between the cable A and the interior of a rigid tube 7 that is made for instance, of rigid polyvinyl chloride. The tube 7 is laid in the earth, indicated at 8 in FIG. 2.

The rigid tube 7 may comprise a single tube or, as shown in FIG. 1, may comprise an inner tube 7a and an outer tube 7b, the tubes being coaxial and bonded to each other, the outer tube constituting armouring of the inner tube.

The plastic tube 7a may be made of polyvinyl chloride, preferably of the rigid type, or of its copolymers, polyester resins, urea resins, phenolic resins, polystyrene resins, melamine resins and so on. The plastic armour 7b which may be advantageously employed may be a polyester resin wherein are embedded fibres, preferably of glass, either in the fibre form or as yarns, tapes or fabrics.

The armouring tube 7b may be entirely omitted where the inner tube 7a is of sufficient rigidity and strength for the purposes intended. The plastic tube 7 is laid in sections suitably jointed according to known methods and techniques to form a continuous fluid tight pipe line.

Owing to the nature of said tube 7, a three-phase system may be obtained by pulling each single-core cable within a separate tube, thus realizing also the possibility of laying a fourth cable as reserve phase. However, the possibility also exists of placing several both single and multi-core cables within the same tube, and moreover cable sections of remarkable length may be employed as in the case of the steel tubes. In fact the plastic tubes have smooth surfaces and consequently the friction resistance between the cable and their inner surface is considerably reduced in spite of the larger weight of the cable due to presence of the impermeable sheath 3, generally made of metal.

In order to obtain a further reduction of the friction coefficient between the cable and the plastic tube, the cable may in some instances advantageously be covered with the additional sheath 5 which is not entirely impermeable and is made of a material having a low friction coefficient against the material constituting the tube. This material may be polyethylene, plastified polyvinyl chloride, that is of the flexible type (in case the tube is made of a material different from polyvinyl chloride), polyamide resin and so on, or the synthetic rubber known under the trade name of "neoprene" (polymerized chlorobutadiene). It is not desirable to make the sheath 5 of plastified polyvinyl chloride in those instances where the tube 7 is of rigid polyvinyl chloride as the plastifier of the former may migrate into the latter and consequently, under the heat action and the cable weight, some sticking would take place between the additional sheath and the tube.

The sliding of the cable as the cable is pulled within the tube when the tube is empty, may be further facilitated by previously spreading talc on its surface or by lubricating it, preferably with glycerine. This is possible because no danger exists of contaminating the cable insulation, that being protected by a covering impermeable to any such lubricating agent. This possibility constitutes a considerable advantage with respect to the cables pulled into steel tubes for which the maximum care must be taken not to contaminate the uncovered insulation.

The cable sheath 3 must be of a completely impermeable material: the only substances at present known, which may comply with this requirement, are metals and glass. In case a new synthetic material having said property were obtained, it could be used for the covering to be applied to the cable core, previously provided with an electric screen, and the sheath of low friction material could be applied over it.

The tubes are filled with a good heat conducting liquid for instance fed from a header tank which causes a slight pressure, quite sufficient for the purpose.

The tightness at the ends between the tubes 7 and the cables A is carried out by means of known methods, as for instance with stuffing boxes.

It follows that inside the tubes a high pressure is not required for the cable operation, different from the case of the cables laid within steel tubes where the high pressure (14–15 atmospheres) of the fluid contained in the tube is necessary for said operation.

The underground pipelines consisting of plastic tubes, are not a novelty by themselves as the present invention uses the same tubes as are already used for water mains, oil pipelines, drainage systems and so on. What is new is the pulling of high tension electric cables within tubes of plastic material filled with a liquid, practically at atmospheric pressure, which is a good heat conductor and does not take part in the electric operation of the cable. In said tubes the cable is of the so-called "self-contained" type, contrary to the above described cable in a steel tube, known as "pipe cable" which is not self-contained as it requires the steel tube as a necessary complementary element.

To the "pipe cable" type belong the nitrogen-pressure cables disclosed by Hoechstaedter Vogel and Bowden (Elektrotechnische Zeitschrift, Berlin, vol. 53, issues 7 and 8 of February 18, 1932, and February 25, 1932, respectively), and the cables of the above cited "oilostatic" system wherein in no case the single cores may be pulled each into a separate tube on account of the magnetic losses as already said.

The main advantage resulting from the present invention is given by the possibility of placing into separate tubes the cables of a multi-phase line and by the facility of insulating the various phases from one another. In such a way:

(1) The circulation currents in the metal sheaths of the cables are avoided;

(2) There is no danger that, even if one core breaks down, the heat so developed may burn also the adjacent cores;

(3) Tubes having a section relatively smaller than that required for the single tube may also be employed as in this latter case the simultaneous introduction and pulling of several cores is to be facilitated.

Further advantages are: the absence of any corrosive action of chemical and electrolytic nature by part of the earth either on the tube or on the cable contained within it; the lower cost of the tubes of plastic material in comparison with the steel tubes; the lower laying cost due to their lightness and facility of handling.

In compliance with the requirements of the patent statutes there have here been shown and described a few preferred embodiments of the present invention.

What is considered new and desired to be secured by Letters Patent is:

1. A system of underground plastic pipelines, at least one self contained high tension electric cable extending lengthwise within the same and longitudinally slidable out of the same, the space within the pipeline not occupied by the cable or cables being filled with a good heat conducting liquid and each cable within the pipeline having cable insulation enclosed within an adherent rigid liquid tight sheath which is impermeable by said liquid, the liquid being at substantially atmospheric pressure so that the pressure of said cable insulation is independent is of the pressure of said filling liquid, said cable or cables placed within the underground pipeline being provided with an additional sheath surrounding the first sheath and made of a material having a low coefficient of friction with respect to the material constituting the pipeline.

2. A system as in claim 1 characterized in that the additional cable sheath is made of polyethylene.

3. A system as in claim 1 characterized in that the additional cable sheath is made of polyamide resin.

4. A system as in claim 1 characterized in that the additional cable sheath is made of polyvinyl chloride of the flexible type.

References Cited in the file of this patent

UNITED STATES PATENTS

| | | |
|---|---|---|
| 1,959,354 | Everest | May 22, 1934 |
| 2,054,046 | Vogel | Sept. 8, 1936 |
| 2,068,940 | Wiseman | Jan. 26, 1937 |
| 2,597,706 | Couchman | May 20, 1952 |
| 2,645,249 | Davis et al. | July 14, 1953 |
| 2,767,239 | Kennedy | Oct. 16, 1956 |

FOREIGN PATENTS

| | | |
|---|---|---|
| 15,180 of 1928 | Australia | Jan. 24, 1929 |
| 453,840 | Great Britain | Sept. 16, 1936 |
| 456,659 | Great Britain | Nov. 9, 1936 |
| 463,892 | Canada | Mar. 21, 1950 |
| 562,595 | Germany | Oct. 6, 1932 |
| 645,785 | Great Britain | Nov. 8, 1950 |
| 989,945 | France | May 30, 1951 |

OTHER REFERENCES

Publication: "Modern Plastics," December 1952 (Butyrate Conduit for Power Lines), page 94.

UNITED STATES PATENT OFFICE
CERTIFICATE OF CORRECTION

Patent No. 3,084,208                April 2, 1963

Giuseppe Palandri et al.

It is hereby certified that error appears in the above numbered patent requiring correction and that the said Letters Patent should read as corrected below.

Column 5, line 5, before "of", first occurrence, strike out "is".

Signed and sealed this 8th day of October 1963.

(SEAL)
Attest:

ERNEST W. SWIDER
Attesting Officer

EDWIN L. REYNOLDS

Acting Commissioner of Patents